April 13, 1965 W. C. KOTHEIMER Re. 25,762

PROTECTIVE RELAY

Original Filed July 17, 1961 4 Sheets-Sheet 1

Inventor:
William C. Kotheimer,
by Albert S. Richardson Jr.
Attorney.

PROTECTIVE RELAY

Original Filed July 17, 1961 4 Sheets-Sheet 2

Inventor:
William C. Kotheimer,
by Albert S. Richardson Jr.
Attorney.

Inventor:
William C. Kotheimer,
by Albert S. Richardson Jr.
Attorney.

PROTECTIVE RELAY

Original Filed July 17, 1961 4 Sheets-Sheet 4

Inventor:
William C. Kotheimer,
by Albert S. Richardson Jr.
Attorney.

United States Patent Office

Re. 25,762
Reissued Apr. 13, 1965

25,762
PROTECTIVE RELAY

William C. Kotheimer, Drexel Hill, Pa., assignor to General Electric Company, a corporation of New York Original No. 3,079,533, dated Feb. 26, 1963, Ser. No. 125,050, July 17, 1961. Application for reissue June 28, 1963, Ser. No. 292,518
7 Claims. (Cl. 317—36)

Matter enclosed in heavy brackets [ ] appears in the original patent but forms no part of this reissue specification; matter printed in italics indicates the additions made by reissue.

This invention relates to a protective relay for an electric current circuit, the relay being adapted to initiate a predetermined control function in delayed response to the occurrence of an abnormal condition in the protected circuit. More particularly, the invention relates to an inverse-time-overcurrent protective relay utilizing no electromechanical parts.

It is common practice in the art of protective relays to protect electric lines or circuits by means of relays designed to respond to abnormal circuit conditions with a time delay inversely related to the severity of the abnormality. For example, the overcurrent protective relay having an inverse-time-overcurrent operating characteristic is well known in the art. Such a relay provides optimum circuit protection when fault or short-circuit conditions develop if its operating characteristic closely parallels an $I^2t$-equals-a-constant relationship, that is, if the relay operating time (t) varies inversely in proportion to the square of the circuit current (I). Thus the relay characteristic will match the damage characteristic of the protected circuit, under fault conditions when the threat of damage is proportional to the current value squared.

While inverse-time-overcurrent relays of electromechanical construction have had a long and successful history, such prior art relay construction does have some recognized drawbacks. The principal one, perhaps, is that of inertia of the movable armature or rotor of the relay; this unavoidable characteristic of the electromechanical construction creates problems of over-travel and undesirably slow reset. Furthermore, the physical size of the electromechanical overcurrent relay is objectionable in some relay applications. Consequently, there is a trend in the relay art today to accomplish the same functional result by means of "static" circuitry, i.e., by utilizing appropriate combinations of semiconductors and other physically small solid-state components having no moving parts.

In order to obtain the requisite time delay in the operation of a static overcurrent relay, it has been normal practice to employ an electric energy storing circuit including a D.C. energized reactance element such as a capacitor. Energization of the energy storing circuit is controlled by a D.C. signal derived from the protected circuit, and the capacitor serves to delay relay operation according to the value of that signal. The relay operates after a delay coinciding with the time which the capacitor takes to charge to a predetermined critical voltage level.

To obtain the desired $I^2t$ operating characteristic, the energization of the timing capacitor in such static overcurrent relays should be varied in direct proportion to approximately the square of the current value in the protected circuit, and it is a general object of the present invention to provide a relay in which this result obtains.

The desired result is not obtained by supplying the timing capacitor with a D.-C. signal directly proportional to circuit current, since this would not yield a satisfactory degree of exponentiality (the operating time will not be inversely related to the second power of the circuit current). A more satisfactory technique in the prior art is that utilizing a periodic energizing quantity in order to charge the timing capacitor in a succession of discrete steps or increments, the cumulative effect of such incremental charging per unit of time being varied in accordance with the value of circuit current. Such a technique has heretofore taken two different forms: the number of occurrences per unit time of a pulsating D.-C. energizing quantity of constant magnitude has been varied as a function of circuit current; or the duration of each occurrence of a constant-frequency succession of constant-magnitude D.-C. energizing pulses has been varied as a sine function of circuit current. These prior art approaches offer the advantage of enabling long time delay to be realized with a timing capacitor which is not objectionably large, but they are less than entirely successful in producing the desired $I^2t$ operating characteristic.

Another object of my invention is the provision of an improved protective relay of the kind utilizing a timing capacitor which is energized by a train of D.C. energizing pulses, the relay being so constructed and arranged that under fault conditions its operating time varies inversely in proportion to the square of a D.-C. signal which controls the energizing pulses.

Inverse-time-overcurrent relays are often used to provide overcurrent protection for electric circuits which include utilization apparatus, or they may be selectively coordinated with other "front-line" protective devices, such as electric fuses. In such applications optimum protection is afforded by a relay whose low-overcurrent, long-time response closely parallel the thermal damage characteristic of the electric apparatus which is being protected. Since a small amount of overload current can be endured for a relatively long period of time without permanent damage to such apparatus, it is desirable, for lowest overcurrent conditions, to have the operating characteristic of the relay depart from the above-mentioned $I^2t$ relationship with the relay operating time being inversely related to a power greater than 2 of circuit current. Accordingly, it is a further object of my invention to provide, for protecting an electric current circuit, an improved inverse-time-overcurrent relay of the kind utilizing a timing element which is energized by a train of D.-C. energizing pulses, the relay having an operating characteristic defined by $I^nt$=a constant, where n is a number which inherently diminishes from magnitudes greater than 2 to 2 as the values of circuit current (I) increase at low levels of overcurrent.

In carrying out my invention in one form, I provide condition responsive means adapted to be coupled to an electric current circuit for deriving therefrom a D.-C. signal which is representative of a characteristic circuit quantity (such as current). The D.-C. signal is added to a high-frequency pulsating signal of triangular waveform, and from the resulting sum a unipolarity reference signal level, just equal to the peak magnitude of the pulsating signal, is subtracted. The difference or net quantity controls the energization of time delay means which includes an energy storing reactance element. Hence the reactance element is energized by a rapid succession of triangular energizing pulses, with the height and consequently the duration of each pulse being both determined by the magnitude of the representative D.-C. signal, and energy is accumulated in the reactance element in small frequent increments, with the magnitude of each increment being proportional to the square of the D.-C. signal magnitude. Upon the occurrence of an abnormal circuit condition, the reactance element starts its incremental accumulation of energy, and in response to a critical level of energy being attained therein, appropriate level detecting means is activated to initiate a predetermined control function such as initiating an opening operation of a circuit interrupter. The time required by the reactance element to accumulate this critical amount of energy varies as an inverse function of approximately the square of the effective magnitude of the D.-C. signal, and an overcurrent protective relay embodying this arrangement will have the desired inverse-time-overcurrent operating characteristic.

My invention will be better understood and its various objects and advantages will be more fully appreciated from the following description taken in conjunction with the accompanying drawings in which.

Figure 1:
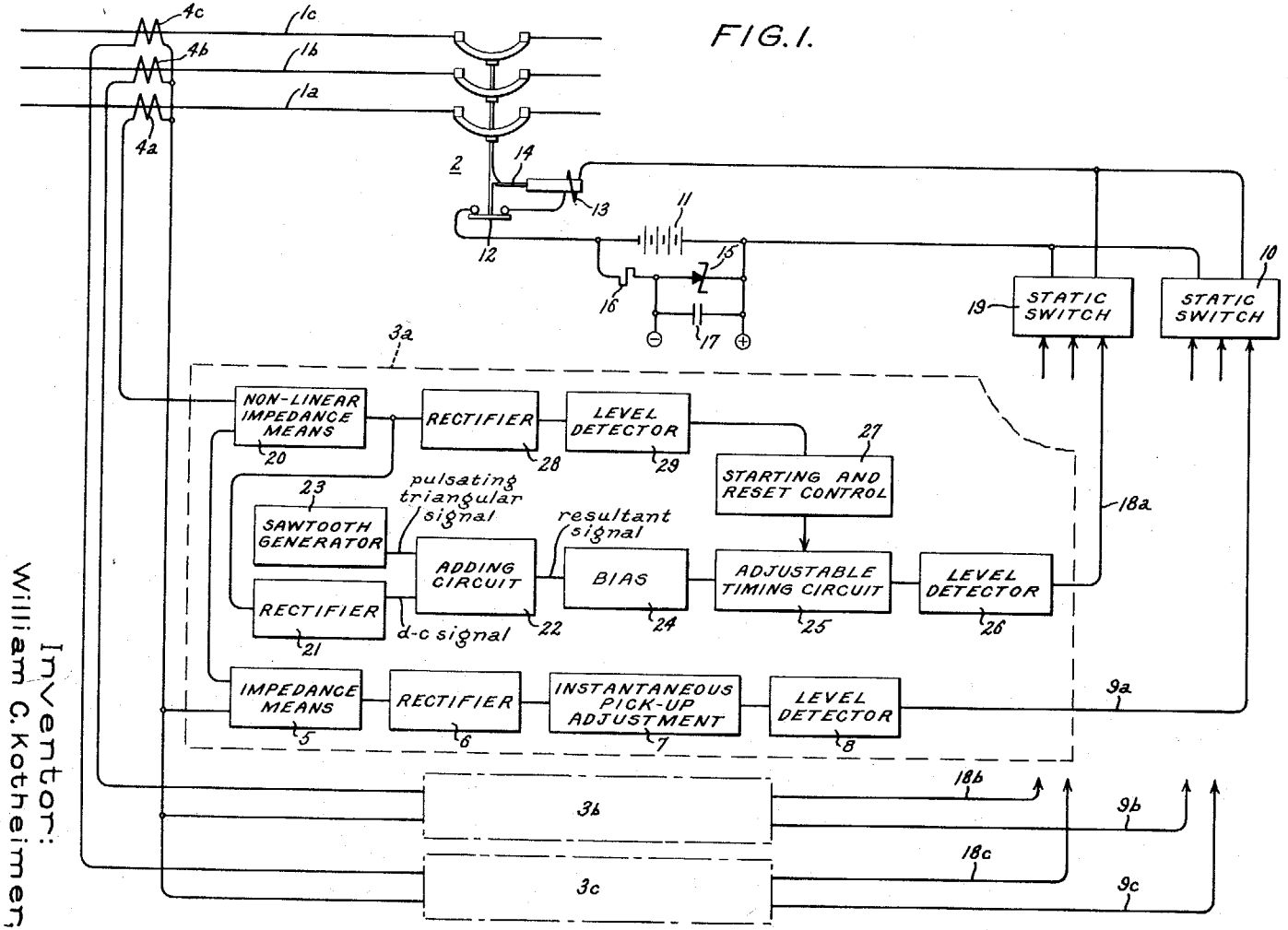
FIG. 1 is a schematic circuit diagram, partly in block form, of an electric current circuit protected by a relaying system constructed and arranged in accordance with a preferred embodiment of my invention.

Referring now to FIG. 1, there is shown in block form a protective relay system for a 3-phase alternating-current electric power circuit. The illustrated circuit comprises three wires 1a, 1b and 1c which are used, for instance, to interconnect a 3-phase source of power and appropriate load apparatus, neither of which are shown. The connection between circuit and power source is controlled by means of a conventional 3-pole circuit breaker 2, shown closed.

In order to provide 3-phase protection for the circuit 1a—1b—1c, identical single-phase relay means 3a, 3b and 3c are provided, respectively, for the three different circuit phases, and for the sake of drawing simplicity the contents of only relay means 3a have been indicated in FIG. 1. Each of the relay means is designed in a like manner to initiate an opening operation of the circuit breaker 2, thereby disconnecting the protected circuit from its power source, in response to the occurrence of an abnormal circuit condition involving that phase with which the responding relay is associated.

Relay means 3a, 3b and 3c each arranged to be energized in accordance with a characteristic electric quantity of the associated circuit, and relay response is intended when this quantity, as a result of an abnormal circuit condition, attains a predetermined "pickup" value. In the illustrated application of the relaying system the characteristic electric quantity is alternating current, and abnormal circuit conditions, such as overloads or short circuits, are indicated by the circuit current rising above its normal, full-load value—the degree of overcurrent being dependent upon the severity of the abnormal condition. In order to obtain this overcurrent response, three star-connected instrument current transformers 4a, 4b and 4c are respectively coupled to the wires 1a, 1b and 1c of the protected circuit, and as can be seen in FIG. 1, the secondaries of these current transformers are connected to the relay means 3a, 3b and 3c respectively.

In the relay means 3a, the secondary current from the current transformer 4a supplies input to both a time delay channel and an instantaneous channel of components. The instantaneous channel, which is designed to respond with no intentional time delay, comprises the following chain of functional components: impedance means 5, a rectifier 6, instantaneous pickup adjustment means 7, and a level detector 8. The impedance means 5 derives an A.-C. voltage representative of the current flowing in circuit 1a, and this is converted to a D.-C. quantity by the rectifier 6. The components 7 and 8 comprise suitable means for substantially instantaneously producing an output control signal at 9a when the D.-C. quantity supplied by rectifier 6 reaches a pickup magnitude corresponding to the predetermined amount of overcurrent in the circuit 1a. Component 7 is preferably adjusted so that this predetermined amount of overcurrent is a high multiple of normal current, because instantaneous operation of the relay means 3a is usually desired only for the most severe abnormal or fault conditions.

The output control signal at 9a of the relay 3a activates a high-speed static switch 10 which, by way of example, may comprise a silicon controlled rectifier. As is indicated in FIG. 1, the static switch 10 will also be activated by output control signals produced at 9b and 9c upon operation of the instantaneous channels in the companion relay means 3b and 3c, respectively. In lieu of a static switch, component 10 could comprise an electromagnetic relay or some other circuit controlling device if desired. The component 10 is instantly effective when activated to complete a tripping circuit for the circuit breaker 2. The tripping circuit includes in series relation a battery 11, a normally open auxiliary contact 12 of the breaker 2, and a trip coil 13. When energized by the battery 11, upon activation of the static switch 10, the trip coil 13 actuates a latch 14 thereby releasing the switch member of the circuit breaker 2 for rapid circuit opening movement.

The battery 11 is also used to provide control power as needed for the various relaying circuits. For this purpose a Zener diode 15, or some other suitable voltage regulating device, is connected in series with a voltage dropping resistor 16 between the battery terminals, as shown. A smoothing capacitor 17 is connected across the Zener diode 15 to aid in absorbing unwanted voltage surges. A Zener diode having a voltage breakdown level of about 20 volts is preferably used, and hence this device comprises a 20-volt source of regulated D.C. supply voltage. The positive and negative D.C. supply voltage terminals are identified throughout the drawings by encircled plus and minus symbols, "+" and "—," respectively.

The remaining components in the relay means 3a comprise the various parts of a time delay channel which is designed, in accordance with my invention, to develop another output control signal at 18a in delayed response to the occurrence of an overcurrent condition in the circuit 1a. The amount of delay obtained is inversely related to the severity of the condition; in other words, this channel will operate with a delay which is longer at small overcurrent values than at higher overcurrents. As is indicated in FIG. 1, the output control signal at 18a is supplied to a second high speed static switch 19 which, like the previously mentioned switch 10, completes the tripping circuit for the circuit breaker 2 when activated. The static switch 19 can also be activated by output control signals produced at 18b and 18c upon operation of the time delay channels in the companion relay means 3b and 3c, respectively.

The time delay channel in the relay means 3a includes suitable non-linear impedance means 20 which is energized by the secondary current of the current transformer 4a. This non-linear impedance means 20 in combination with a rectifier 21 comprises condition responsive means for deriving from the protected circuit 1a a representative D.-C. signal the effective magnitude of which is dependent upon the value of circuit current. The reason for using non-linear impedance means will be explained in the more detailed description of the relay set forth hereinafter.

As is shown in FIG. 1, the D.-C. signal provided by the rectifier 21 of the condition responsive means is added in an adding circuit 22 to a pulsating triangular signal which is supplied by a sawtooth generator 23 or the like. This pulsating signal comprises a succession of triangular-waveform signal pulses of substantially constant peak magnitude, and the inherent rate of recurrence or frequency is relatively high compared to the frequency of the current in circuit 1a.

The adding circuit 22 of my invention provides a resultant signal corresponding to the sum of the D.-C. signal and the pulsating trangular-waveform signal, and the resultant signal is passed through a bias component 24 which subtracts therefrom a unipolarity reference signal level equivalent to the peak magnitude of the pulsating signal. Thus the output of the bias component 24 comprises a rapid succession of triangular D.-C. pulses, both the amplitude and the duration of every pulse being directly proportional to the magnitude of the D.C. signal and hence being dependent upon the current value in the protected circuit 1a.

I next provide an adjustable timing circuit 25 for energization in accordance with the output of component 24. The adjustable timing circuit 25 includes a normally deenergized reactance element, and its function is to [acculate] *accumulate* electric energy, when such is permitted, until a predetermined critical energy level is attained. As soon as that critical energy level is attained, a level detector 26 connected to the timing circuit 25 operates substantially instantaneously to produce the aforesaid output control signal at 18*a*.

No energy can be accumulated in the normally deenergized reactance element of the timing circuit 25 unless permitted by an associated starting and reset control component 27. As can be seen in FIG. 1, the component 27 is coupled to the protected circuit 1a by means of the non-linear impedance means 20, a rectifier 28 and a suitable level detector 29. The function of this chain of components is to keep the timing circuit 25 inactive or disabled until an abnormal circuit condition occurs, as evidenced by the rise of circuit current above normal. The value of circuit current to which the starting and resetting control responds is designated "pickup" current. Once pickup current is attained, the timing circuit 25 is able immediately to start its timing function. Should the circuit current return to normal before the timing operation is finished, the starting and reset control 27 is effective to quickly and fully deenergize or reset the reactance element in the timing circuit, thereby avoiding the possibility that residual energy accumulation in the reactance element might undesirably shorten the relay operating time if another overcurrent condition were to occur soon thereafter.

Figure 3:
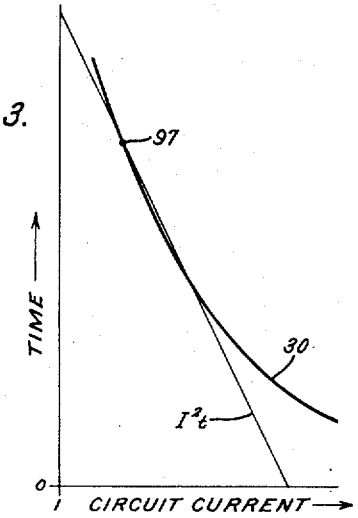
FIG. 3 is a graph of the inverse-time-overcurrent operating characteristic of the particular relay means shown in FIG. 2.

Due to the above-mentioned form of energization [supplified] *supplied* to the adjustable timing circuit 25 of the relay means 3a, the time required for its reactance element to accumulate the aforesaid critical energy level, following the occurrence of an overcurrent condition, is inversely proportional to an exponential function (approximately the square) of the D.-C. signal magnitude, and therefore the time delay channel of components 18–29 of the relay means shown in FIG. 1 operates with the desired inverse-time-overcurrent characteristic. The operating characteristic actually obtained has been graphically illustrated in FIG. 3 which is a conventional time vs. current graph. In FIG. 3, both coordinates are scaled logarithmically, and the amount of current in the protected circuit, in terms of multiples of pickup, is plotted along the abscissa.

Figure 2:
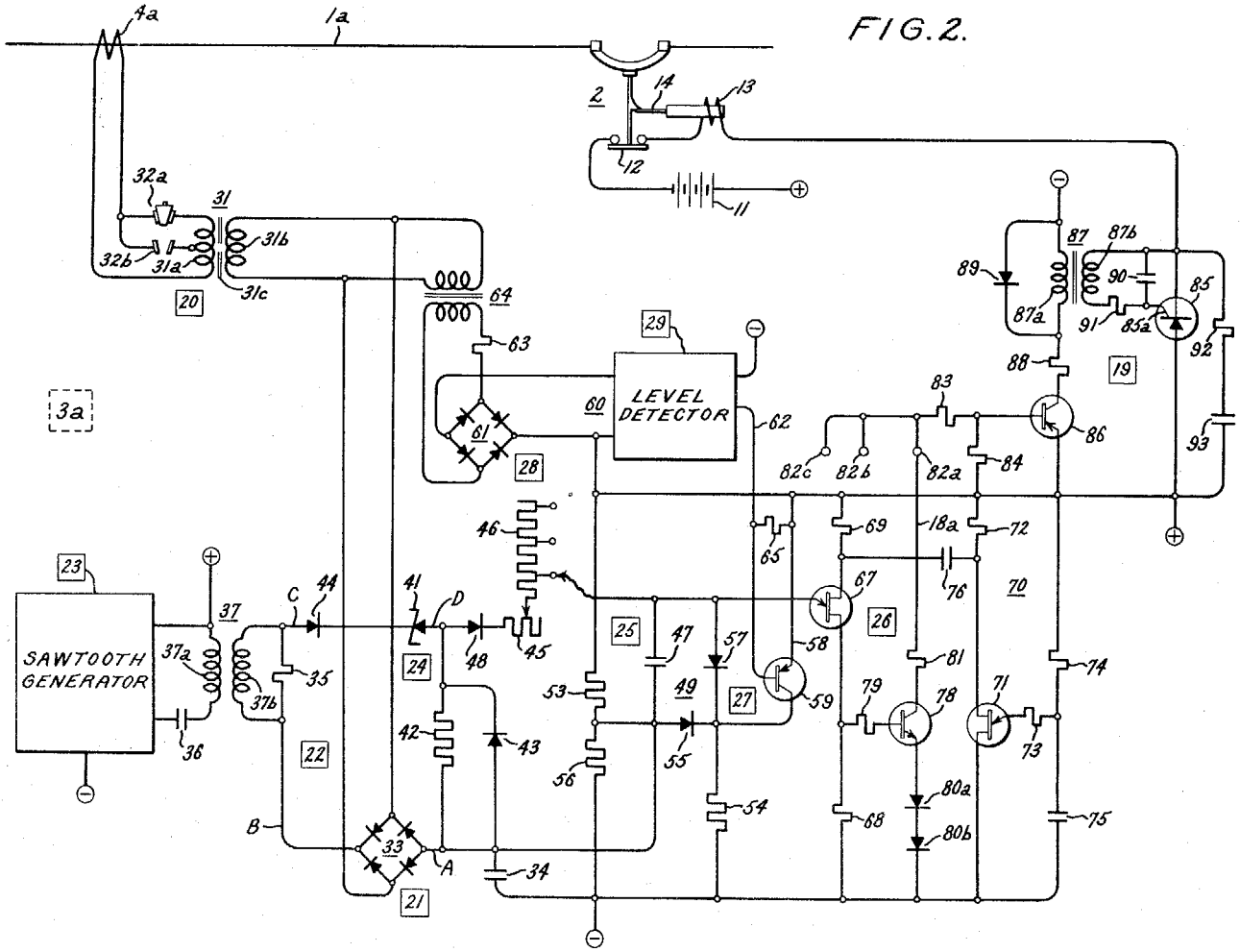
FIG. 2 is a schematic circuit diagram illustrating specific components and circuitry of the protective relay shown in block form in FIG. 1.

The curved line 30 in FIG. 3 defines the relay operating characteristic for one particular time adjustment, and its approximation of a true inverse-square current-time relationship is apparent by comparing curve 30 to the straight line labeled $I^2t$. In applying the present relay, its operating characteristic commonly is required to be selectively coordinated with the inherent operating characteristics of other protective devices, such as electric fuses or electromechanical relays, and for this reason the low-overcurrent (less than about three times pickup) end of the operating characteristic 30 has, as will be observed in FIG. 3, been made to depart in an extended time direction from the $I^2t$ line. The manner in which this desired departure is obtained will be explained in the detailed description of my invention to follow. For the same reason, at high multiples of pickup which accompany severe overcurrent conditions, relay operation has been prolonged relative to a true inverse-square responsive time, and this is illustrated in FIG. 3 where the relay operating characteristic 30 will be seen to deviate, in a longer-time sense, from the $I^2t$ line at its high-overcurrent (more than about six times pickup) end. The manner of obtaining this desired deviation will be explained in the detailed description which follows:

With reference now to FIG. 2, a detailed circuit description will be given of the preferred embodiment of the time delay channel of the relay means 3a shown symbolically in FIG. 1. The illustrated relay is adapted to be inductively coupled, by means of the current transformer 4a, to the alternating current circuit which is represented in FIG. 2 at 1a. The secondary winding of the current transformer is connected to saturable transforming means 31 which comprises the non-linear-impedance-means component 20 of FIG. 1. The transforming means 31 includes primary and secondary windings 31a and 31b, respectively, and a magnetizable core 31c having an air gap. The primary winding 31a, which is connected to the current transformer 4a, is provided with a plurality of preselected taps 32a and 32b so that the number of turns energized by the secondary current of the current transformer can be conveniently changed. In this way the pickup setting of the relay, measured in terms of current transformer secondary amperes, can be changed to suit the particular needs of several different relay applications.

The transforming means 31 derives across its secondary winding 31b an A.-C. voltage which is dependent upon the alternating current in the circuit 1a. This transforming means is designed so that its secondary voltage is linearly representative of the circuit current for a predetermined first range of overcurrent values. When current values exceed this first range, however, saturation begins and the secondary voltage increments will become progressively smaller as the secondary voltage approaches a predetermined maximum level. It is because of this non-linear relationship in the higher overcurrent region that the desired deviation of the relay operating characteristic from an $I^2t$ line at high multiples of pickup (see FIG. 3) is obtained.

Rectifying means, preferably comprising the full-wave bridge type rectifier 33 illustrated in FIG. 2, is connected to the secondary winding 31b of the transforming means 31 in order to provide the D.-C. signal which is used to control the energization of the timing circuit of the relay. The D.-C. signal comprises a succession of unipolarity half-cycle waves representative of the A.-C. voltage applied to the rectifier, and hence representative of the alternating current in the circuit 1a; no filtering or smoothing means need be used. It is apparent, therefore, that the rectifier 33 provides a D.-C. signal (voltage) the effective magnitude of which is dependent upon the value of the circuit current. Since the transforming means 31 is in its linear region (not saturated) during relatively mild overcurrent conditions, the effective magnitude of the D.-C. signal will be directly proportional to the amount of circuit current throughout the aforementioned first range of overcurrent values.

The negative and positive D.-C. terminals of the rectifier 33 are connected, respectively, to conductors A and B. Conductor A is connected to the negative supply voltage terminal (the encircled minus symbol) through a surge suppressing capacitor 34 of very small capacitance. Conductor B is connected to a resistor 35 which is supplied with a pulsating signal of triangular waveform by a pulsating signal (voltage) source comprising, in the preferred embodiment of the relay, the sawtooth generator 23. The sawtooth generator circuitry has not been shown in detail since I contemplate that it will be conventional. As a practical example, circuitry such as that described and claimed in United States Patent No. 2,792,499, Mathias, granted on May 14, 1957, could be used.

The output circuit of the sawtooth generator 23 is coupled by means of a capacitor 36 to the first winding 37a of a step-up transformer 37, and there is consequently developed in the second transformer winding 37b an A.-C. signal having a triangular waveform of substantially constant amplitude. The parameters of the generator 23 and the turns ratio of transformer 37 are selected so that the amplitude (peak magnitude) of this signal is a predetermined desired height (for example 20 volts), and the signal frequency is arranged to be relatively high (for example, 2,000 cycles per second) compared to that of the alternating current in circuit 1a (60 cycles per second, for example).

The transformer winding 37b is connected across the resistor 35 which, in turn, is connected between the conductor B and a conductor C. As is apparent in FIG. 2, the conductors A, B and C comprise adding means providing, between conductors A and C, a resultant signal corresponding to the sum of the D.-C. and A.-C. signals appearing at rectifier 33 and transformer winding 37b, respectively. This is the adding circuit 22 of FIG. 1. The potential of conductor C, measured with respect to conductor A, is equal to the instantaneous magnitude of the D.-C. voltage across the rectifier 33 plus (or minus, during negative half cycles) the instantaneous magnitude of the serially related A.-C. voltage across the resistor 35. This adding function could be accomplished in ways other than by the series circuit shown; for example, the D.-C. signal and the pulsating triangular signal might comprise different currents flowing through a common resistor, whereby the resultant voltage drop across the resistor would reflect the sum of the super imposed currents.

Figure 6:
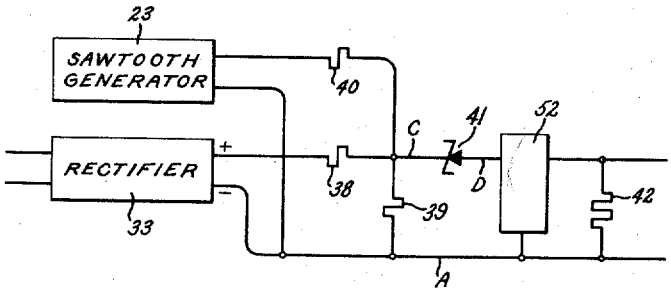
FIG. 6 is a schematic circuit diagram, partly in block form, of an alternative arrangement of part of the protective relay shown in FIG. 2, thereby illustrating a second embodiment of my invention.

One form of the alternative adding means suggested above has been illustrated in FIG. 6 by way of example. In this figure the sawtooth generator 23 and the rectifier 33 are both shown in block form. The D.-C. signal provided by the rectifier 33 in FIG. 6 causes a direct current to flow through series-connected resistors 38 and 39, and the pulsating signal provided by the generator 23 causes a triangular waveform current to flow through series-connected resistors 40 and 39. If the resistances of the resistors 38 and 40 are made equal to each other, the resultant voltage drop across the common resistor 39 will be directly proportional to the sum of the two different signals. The remainder of the circuit revealed in FIG. 6 will be described later in this specification.

In association with the adding means A, B, C illustrated in FIG. 2, appropriate impedance means 41 is provided for introducing, in subtractive relationship with the resultant signal which is developed between conductors A and C, a unipolarity reference signal level equal to the peak magnitude of the pulsating triangular-waveform signal appearing between conductors B and C. The impedance means 41 thus performs a biasing function, and it is the circuit element of the relay corresponding to the "bias" component 24 shown in block form in FIG. 1. Preferably, as is shown in FIG. 2, the element 41 is a Zener diode or the like, such a device having an abrupt breakdown characteristic which enables it to block the flow of reverse current as long as the reversely poled applied voltage is less than a predetermined breakdown level, at which point it enables the reverse current to flow while limiting the voltage drop thereacross to the predetermined breakdown level.

The voltage breakdown level of the impedance means 41 is the unipolarity reference signal level referred to. In the illustrated embodiment of my invention, a Zener diode 41 having a 20-volt breakdown characteristic is used, and this determines the desired height of the A.-C. voltage amplitude across winding 37b. Hence the reference signal level is equivalent to the peak magnitude of the triangular-waveform pulsating signal supplied by the sawtooth generator 23. It will be understood by those skilled in the art that circuit elements other than a Zener diode might be satisfactorily used for establishing the unipolarity reference signal level; for example, a resistor energized by an appropriately poled 20-volt bias battery would have a similar effect.

As can be seen in FIG. 2, the Zener diode 41 is serially connected between conductor C of the adding circuit and another conductor D, and it is poled in opposition to the polarity of the rectifier 33. Accordingly, its breakdown voltage is subtracted from the resultant voltage provided across conductors A and C, and the difference or net voltage taken across conductors A and D is supplied to a resistor 42 connected therebetween. In order to ensure that the potential of conductor D will never go negative with respect to conductor A, an appropriately poled diode 43 is connected in parallel with the resistor 42, and another diode 44 is serially inserted between conductor C and the Zener diode 41, as shown.

Figure 4:
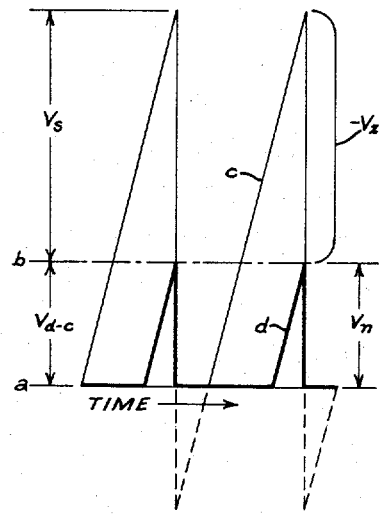
FIGS 4–5 are voltage vs. time charts set forth to advance a simplified explanation of the operation of my invention.

The various voltage relationships described thus far have been graphically illustrated in FIG. 4 for two cycles of the sawtooth generator 23. In FIG. 4 the D.-C. signal provided by the rectifier 33 (the potential $V_{d-c}$ of conductor B taken with respect to conductor A) is represented by the height of the dot-dash line b above the base line a, and for the sake of a simplified explanation it is shown at a constant magnitude of about ten volts. The succession of triangular-waveform signal pulses supplied by the sawtooth generator 23 (the voltage between conductors C and B, having a substantially constant amplitude $V_s$), is represented by the trace c which is symmetrical with respect to the line b. From the resultant voltage measured between conductors A and C of the adding circuit (between the base line a and trace c in FIG. 4), the Zener diode reference voltage level $V_z$ is subtracted. When and to the extent that the resultant voltage magnitude exceeds the reference voltage level, a net voltage is developed across resistor 42 (between conductors A and D), and this is represented in FIG. 4 by the heavy line d.

It will be observed in FIG. 4 that the net voltage d comprises a succession of triangular D.-C. pulses whose frequency and waveform correspond to those of the pulsating triangular signal c, and the maximum or peak magnitude of this voltage has been identified as $V_n$. Since $V_z$ and $V_s$ are selected to be equal to each other, $V_n$ is necessarily equal to $V_{d-c}$. As a result, both height and base of each net voltage pulse are directly proportional to the magnitude of the D.-C. signal derived from the alternating current circuit 1a, and the area of each pulse is directly proportional to the square of that magnitude. The diodes 43 and 44 shown in FIG. 2 aid in clipping negative-going portions of the resultant voltage—whenever the conductor C is negative with respect to conductor A, as indicated by the broken-line portions of trace c in FIG. 4, the potential difference between conductors C and D will be impressed across the diode 44.

In FIG. 2 it will be seen that the adding circuit A, B, C, with the impedance means 41 in series therewith, has connected thereto electric energy storing means comprising the series combination of resistance elements 45 and 46 and a normally deenergized reactance elements 47. This energy storing means is the adjustable-timing circuit component 25 of FIG. 1. As shown in FIG. 2 the reactance element 47 is a capacitor, and preferably one having a capacitance of six microfarads is used. The resistance elements 45 and 46 are both potentiometers which enable time adjustments to be made in the operating characteristic of the relay means 3a. The potentiometer 46 has a relatively large total resistance, such as 500,000 ohms, and it is provided with a plurality of taps at predetermined intervals for field selection of the desired time setting. The vernier potentiometer 45 is used for precise factory adjustment.

The elements 45–47 form an RC circuit, and this circuit is connected across the resistor 42 for energization in accordance with the net voltage developed between conductors A and D. As is shown in FIG. 2, a diode 48 is disposed between the potentiometer 45 and conductor D to block discharge of the capacitor 47 into its D.-C. energizing circuit. The relay circuitry hereinbefore described causes periodic energization of the RC circuit by a train of triangular-waveform voltage pulses recurring at a relatively high frequency (2,000 c.p.s.), and the timing capacitor 47 will be charged in a rapid succession of small steps or increments by this pulsating energizing quantity. The variable maximum magnitude and duration of each energizing pulse is determined by the magnitude of the D.-C. signal (at rectifier 33) which is derived from the alternating-current circuit 1a.

The capacitor 47 is normally maintained in a discharged state by supervising means 49 associated therewith, and a description of the supervising means will follow hereinatfer. Before that, however, it is appropriate to note that when capacitor charging is permitted, the time required for it to accumulate a predetermined amount of energy will be inversely proportional to approximately the square of the maximum magnitude $V_n$ of the energizing quantity. This will be best understood by referring to the greatly simplified example illustrated in FIG. 5.

Figure 5:
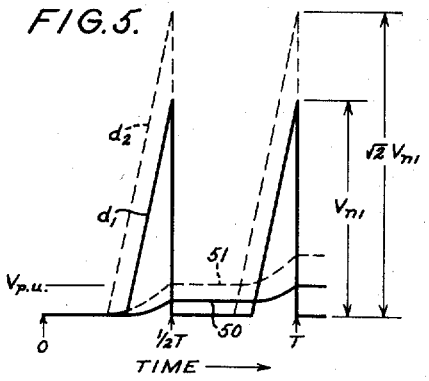

FIG. 5 is a chart of capacitor voltage vs. time for two complete cycles of the sawtooth generator 23, and two different circuit conditions have been illustrated. In the first instance, the maximum instantaneous magnitude of the train of traingular energizing pulses $d_1$ supplied to the RC energy storing means is $V_{n1}$. Assuming that capacitor charging is permitted as of time 0, the resulting voltage buildup across the capacitor 47 as energy is accumulated therein is represented by the solid line 50. In actual practice, a period of the pulsating energizing quantity $d_1$ is much shorter than (less than one-fiftieth, for example) the time constant of the series RC energy storing circuit, and consequently the energy increment in capacitor 47, per energizing pulse, will be directly proportional to the product of the pulse's maximum magnitude and the time during which its effects charging of the capacitor. After two cycles (at time T in FIG. 5), the capacitor 47 has been charged to a voltage level $V_{p.u.}$, and for the sake of illustration it will be assumed that at this point the energy accumulation in the capacitor is just equal to the aforesaid predetermined amount.

For the second condition shown in FIG. 5, it is assumed that there is a greater amount of overcurrent in circuit 1a so that the maximum magnitude of the D.-C. energizing pulses (broken line $d_2$) has increased to $\sqrt{2}V_{n1}$. Under this new condition, voltage builds up across capacitor 47 in the manner represented by the broken line 51 in FIG. 5. The area of each of the larger triangular pulses $d_2$ is twice that of each of the original pulses $d_1$, and the capacitor charge at the end of the inital cycle of the new condition is double what it had been in the original instance. With the $\sqrt{2}$ increase in magnitude of the energizing quantity, therefore, a voltage level $V_{p.u.}$, corrosponding to said predetermined amount of accumulated energy in capacitor 47, is attained in just about one-half the time formerly required. This shows that there is essentially an inverse-square relationship between the capacitor charging time and the maximum magnitude of the energizing quantity, which magnitude is determined by the D.-C. signal derived from the alternating current circuit.

An exact inverse-square relationship is not obtained due to the effect which prior energy accumulation in the capacitor 47 has on each subsequent period of capacitor charging. It is apparent from a consideration of FIG. 5 that successive periods of capacitor charging will become progressively shorter as the level of capacitor voltage rises, and the charge increment per cycle of the sawtooth generator decreases with time. Thus the critical voltage level $V_{p.u.}$ which has been used as an example is slightly under twice the value of the capacitor voltage 50 at the end of the first sawtooth generator cycle, and this level is attained by the broken-line voltage 51 just prior to the time ½ T.

A more exact inverse-square relationship can be obtained, if desired, by inserting between the impedance means 41 and the resitsor 52 of FIG. 2 a low-pass filter arranged to derive a continuous D.-C. quantity the average magnitude of which is directly proportional to the square of the magnitude of the D.-C. signal at rectifier 33. This is illustrated in the alternative embodiment of the invention shown in FIG. 6 where the block identified by the reference numeral 52 represents the suggested low-pass filter. In accordance with this alternative, the energy storing means of the relay in effect comprises two separate sections: a first section (the low-pass filter) which squares the difference or net voltage developed between conductors A and D; and a second section (the RC timing circuit) which integrates the squared quantity. But I prefer the relay embodiment shown in FIG. 2 because it yields a satisfactory degree of inverseness without the added expense and somewhat prolonged operating time (at high multiples of pickup current) which would attend the use of a low-pass filter.

Returning to FIG. 2, the supervising means 49 which normally prevents the accumulation of energy in the capacitor 47 will now be described. This supervising means comprises two impedance elements or resistors 53 and 54 connected from the positive and negative D.-C. supply voltage terminals, respectively, to differently poled terminals of capacitor 47, and a diode 55 connected between these two resistors in parallel relationship with the capacitor. The positive electrode or anode of the diode 55 is connected to resistor 53; consequently it is poled in a blocking disposition relative to the D.-C. energizing circuit of capacitor 47 while being normally conductive with regard to current flowing from the positive supply voltage terminal through resistors 53 and 54 to the negative supply voltage terminal. A third resistor 56 is connected directly between the resistor 53 and the negative supply voltage terminal, across the combination of diode 55 and resistor 54. A second diode 57, poled in a conducting disposition relative to the capacitor energizing circuit, is serially connected between the negative electrode or cathode of the diode 55 and the relatively positive terminal of capacitor 47. It is apparent that while the diode 55 is conducting (forward biased), the potential difference across the terminals of capacitor 47 must necessarily be negligible, and no appreciable energy can be accumulated or stored therein.

The supervising means 49 includes normally inactive shunt circuit means 58 connected across the combination of the resistor 53 and the diode 55 in series therewith. The shunt circuit means, which preferably comprises the emitter-collector circuit of a PNP transistor 59 as is shown in FIG. 2, is arranged to provide, when active, a relatively low-impedance path between the positive supply voltage terminal and the cathode of diode 55. Consequently, activation of the shunt circuit means 58 renders the diode 55 non-conductive (reverse biased) and hence enables charging of capacitor 47 to take place. The second diode 57 keeps positive supply voltage potential from appearing on the relatively positive terminal of capacitor 47 when the shunt circuit means 58 is in its active (low-impedance) state. Whenever it is desired to have the normally deenergized capacitor 47 begin accumulating energy, the shunt circuit means 58 is activated by suitable starting means 60 associated with supervising means 49.

The supervising means which has been described hereinabove comprises the starting-and-reset-control component 27 of FIG. 1, and it is the claimed subject matter of a copending patent application, S.N. 128,241, filed on August 1, 1961, for C. A. Mathews and E. M. Smith, and assigned to the assignee of the present invention.

The starting means 60 illustrated in FIG.2 comprises a full-wave bridge type rectifier 61 (the rectifier component 28 of FIG. 1) and the level detector 29 (also shown in FIG. 1). The output circuit 62 of the level detector is connected to the base electrode of the transistor 59 which is part of the supervising means 49. The input signal for the level detector 29 is provided by the rectifier 61 whose A.-C. terminals are connected through a resistor 63 and a 1:1 ratio isolating transformer 64 to the secondary winding 31b of the transforming means 31. Thus the level detector input and the D.-C. signal provided by rectifier 33 for the adding circuit 22 described hereinbfeore are both derived from the same source and have equal magnitudes, the magnitudes of both being correspondingly dependent upon the value of alternating current in the circuit 1a.

The level detector 29 comprises any suitable circuit arrangement capable of producing a negative-going output signal in high speed, switch-like response to its input signal attaining a predetermined pickup level. Since it is thought unnecessary to show circuitry details for a complete understanding of the present invention, reference is made to the copending patent application, S.N. 25,915, filed on May 2, 1960, for M. E. Hodges, and assigned to the assignee of the present invention, *now Patent No. 3,067,340*, in which a level detector particularly well suited for the present purpose is fully described and claimed.

The output circuit 62 of the level detector 29 is coupled to the positive supply voltage terminal by a load resistor 65, and the emitter-base junction of the transistor 59 is connected across resistor 65 as is shown in FIG. 2. When the level detector input signal reaches its pickup level, the immediately resulting output signal causes a voltage drop across the load resistor 65 and current flow is effected in the emitter-base junction of the transistor 59. This forward bias of the emitter-base junction activates or turns on the transistor, and consequently the shunt circuit means 58 is changed from its normally inactive (high impedance) state to an active (low impedance) one. As a result, the normally conducting diode 55 of the supervising means 49 is rendered non-conductive, and the capacitor 47 can start charging.

In a preferred embodiment of the invention, the predetermined pickup level to which the level detector 29 responds is selected so that the starting means 60 will operate as described above when the value of the voltage across the transformer secondary winding 31b attains four volts R.M.S. This 4-volt value of secondary voltage corresponds to the pickup value of alternating current in circuit 1a, the absolute value of circuit current at pickup being determined by the particular primary winding tap (32a, 32b) in use.

The level detector 29 is arranged to discontinue its output signal whenever its input signal falls below a predetermined dropout level, the dropout level preferably being selected to be at least 90 percent of the above-mentioned predetermined pickup level. Consequently, as soon as current in the circuit 1a decreases to a corresponding dropout value, the starting means 60 (which preferably "drops out" with no intentional time delay) can no longer sustain a forward bias at the emitter-base junction of the transistor 59. As a result, the transistor 59 is turned off (rendered non-conductive), and the shunt circuit means 58 returns to its normally inactive state. This removes the reverse bias of diode 55, and whatever charge may have been accumulated by the timing capacitor 47 is quickly dissipated by the supervising means 49, thereby resetting the relay means 3a. The parameters of the supervising means 49 preferably are so selected that in less than one-sixth of a second, following the inactivation of shunt circuit means 58, capacitor 47 is almost completely discharged or reset.

During normal circuit conditions, the shunt circuit means 58 of the supervising means 49 will remain inactive, and consequently the capacitor 47 of the RC timing circuit is normally discharged and has no energy stored therein. However, in response to the occurrence of an abnormal circuit condition, as evidenced by the current in circuit 1a attaining at least its pickup value, the starting means 60 operates to activate the shunt circuit means 58, and the capacitor 47 is able to begin accumulating energy from its D.-C. energizing circuit as previously explained. Capacitor charging continues until the above-mentioned predetermined amount of energy has been accumulated, the time required for such accumulation being inversely related to the severity of the abnormal condition as reflected by the amount of overcurrent in the circuit 1a. At this point the capacitor voltage has built up to a predetermined critical level which is illustrated, by way of example, as $V_{p.u.}$ in FIG. 5. In order to ensure ample energization to cause ultimate relay operation whenever capacitor charging is permitted, even if the circuit current should only slightly exceed its pickup value, a critical voltage level $V_{p.u.}$ is chosen that is equal to the maximum instantaneous value of the D.-C. energizing signal (the net or difference voltage between conductors A and D in FIG. 2) produced when circuit current has a predetermined value well below the aforesaid pickup value. Preferably this last-mentioned predetermined value of circuit current is less than one-half the pickup value, and the critical level of capacitor voltage is two volts.

The attainment of the predetermined amount of accumulated energy in capacitor 47 is detected by suitable level detecting means 26 connected thereto. As is shown in FIG. 2, the preferred level detector 26 comprises a semiconductor double base diode 67 known in the art as a unijunction transistor. (A conventional unijunction transistor and its unique operating characteristics are disclosed, for example, in United States Patent No. 2,769,-926, Lesk, granted on November 6, 1956.)

Base-one of the unijunction transistor 67 (the lower base electrode as viewed in FIG. 2) is connected to the negative supply voltage terminal by way of a resistor 68, and base-two is connected to the positive supply voltage terminal by way of a resistor 69. For improved temperature stability, the resistances of resistor 68 and 69 preferably are selected to be equal to each other. The emitter of the unijunction transistor 67 is connected directly to the relatively positive terminal of the timing capacitor 47.

So long as the potential of the unijunction transistor emitter is less positive with respect to base-one than a characteristic peak point emitter voltage, the unijunction transistor 67 is cut off or inactive (and consequently its interbase impedance is high), and only quiescent current flows through the base-one resistor 68. When its emitter potential is raised to this critical peak point emitter voltage, however, the unijunction transistor 67 abruptly changes to an active, relatively low-impedance state and there is an appreciable increase in current flowing through resistor 68. The succeeding relay circuits are designed to respond to this current increase, and hence it is the activation or firing of the unijunction transistor 67 of the level detector 26 that initiates the output control signal of the inverse-time-overcurrent relay means 3a.

The particular unijunction transistor 67 which I prefer to use as the level detector 26 is arranged for activation when the peak point emitter voltage has a value of ten volts. Since this device is to be activated in response to the timing capacitor 47 being charged to a critical voltage level of only two volts, as has been explained hereinabove, an 8-volt bias is provided in series with the capacitor voltage. This bias is conveniently provided by the resistor 56, connected as is shown in FIG. 2 between the relatively negative terminal of capacitor 47 and the negative supply voltage terminal, in conjunction with the resistor 53 of the supervising means 49. By appropriately choosing the resistance values of the resistors 53 and 56, the voltage drop across resistor 56, with the diode 55 reverse biased, is made just equal to eight volts. Selection of the desired bias voltage can be facilitated by adding a potentiometer (not shown) in between the two resistors 53 and 56. As is apparent in FIG. 2, the emitter voltage of the unijunction transistor 67 before activation thereof comprises the voltage of the capacitor 47 plus the bias voltage across resistor 56.

The unijunction transistor 67 is activated or fired when the energy being accumulated in capacitor 47 attains its predetermined critical level, whereupon the capacitor 47 is quickly discharged through a path including the then low-impedance emitter-base-one junction of the unijunction transistor and the resistor 68. Capacitor charging is accomplished in small, high frequency steps, as explained hereinbefore. The charging circuit includes the resistance elements 45 and 46, and these elements, in series combination with the capacitor 47, determine the time constant of the RC timing circuit. In order to obtain the desired maximum time delay in a reliable relay 3a of the smallest possible physical size, the capacitance of capacitor 47 has been kept relatively small and the total resistance of elements 45 and 46 has been made quite large. This high resistance, which is in the emitter circuit of the unijunction transistor 67, could result in a "stalling" problem (to be explained below), particularly during low-grade overcurrent conditions when the emitter voltage of the unijunction transistor will be found approaching its peak point relatively gradually as the charge on capacitor 47 slowly nears its critical 2-volt level three seconds or longer after the start of capacitor charging.

A certain minimum value of emitter current (the peak point current, which may be .000005 ampere, for example, at an interbase voltage of 20 volts) is required to fire a unijunction transistor, and the emitter circuit must be capable, of course, of delivering current of at least this value in order to activate the device. It is known that the rate of emitter increase toward this peak point, immediately before firing, characteristically begins increasing when the emitter voltage applied to the unijunction transistor is less than one-tenth of a volt below its peak point. If the magnitude of the quantity energizing the timing circuit of the illustrated relay were not appreciably in excess of pickup (four volts), there is a possibility that the large resistance elements 44 and 45 might limit emitter current to a value less than peak point, in which case the peak point emitter voltage could not be reached. This possibility would materialize if the emitter current in the unijunction transistor 67, before activation thereof, were sufficient to cause all of the relatively small increment of charge accumulated by capacitor 47 during each triangular pulse just prior to the attainment of the critical firing level to be drained off (discharged) before the next succeeding pulse appears. In other words, the peak point would never be reached and the unijunction transistor 67 would stall if the last small increments of capacitor charge necessary to raise the emitter voltage to its peak point were decrementally dissipated as rapidly as supplied.

To avoid the above-mentioned possibility of stalling, the unijunction transistor 67 actually selected has a peak point emitter voltage whose nominal value is about twelve volts, and periodically active sampling means 70 is associated therewith for increasing the sensitivity thereof to the above-mentioned 10-volt level at predetermined time intervals. As can be seen in FIG. 2, the preferred sampling means 70 comprises another unijunction transistor 71 the base-one of which is connected directly to the negative supply voltage terminal. A resistor 72 is connected between the positive supply voltage terminal and base-two of the unijunction transistor 71, and the emitter of this device is connected through a current limiting resistor 73 to the junction of a resistor 74 and a capacitor 75 which are serially connected between the supply voltage terminals. Thus a well-known relaxation oscillator is formed, and it is coupled to the unijunction transistor 67 by means of a suitably small capacitor 76 which interconnects the base-two electrodes of both unijunction transistors 67 and 71.

The parameters of the sampling means 70 are so selected that the predetermined time intervals between active moments thereof are each from two to eight times longer than the period of the triangular-waveform signal pulses supplied by the sawtooth generator 23. Preferably the sampling means is arranged to operate at a frequency of 300 cycles per second, and therefore there are 6⅔ cycles of the sawtooth generator per cycle of the sampling means. Each time the sampling means 70 is active, it causes the base-two potential of the unijunction transistor 67 to be depressed by a sufficient amount to reduce the peak point emitter voltage (which is dependent upon the interbase voltage) to the requisite ten volts.

Three hundred times a second the periodically active sampling means 70 enables the unijunction transistor 67 of the level detector 26 to respond if the capacitor 47 has accumulated enough energy during the preceding 6⅔ energizing pulses to raise the total capacitor charge above the predetermined critical firing level. It will be apparent that this arrangement virtually eliminates the above-discussed problem of stalling. During the .003-second time interval between active moments of the sampling means 70, the emitter voltage applied to unijunction transistor 67 will be well below its nominal peak point (about twelve volts), and the emitter current is then negligible. As a result, the amount of capacitor charge that can be drained off between consecutive energizing pulses is so very small that a significant net increase in emitter voltage is always obtained during each time interval, even if the interval overlaps a moment at which the half-cycle wave of the D.C. signal at rectifier 33 goes to zero. At the expiration of an appropriate time delay, the emitter voltage will be increased during one of the sampling intervals from a value below to a value at least as great as the 10-volt peak point, and when the sampling means 70 is next active, firing of the unijunction transistor is assured. This beneficial result has been achieved at the expense of delaying the relay operating time by a maximum of three milliseconds which is not long enough, even under severe overcurrent conditions when very short-time response is desired, to affect adversely the performance of the relay.

The above-described sampling means is subject matter of a copending patent application, S.N. 128,472, filed on August 1, 1961, for C. A. Mathews, and assigned to the assignee of the present invention.

It has been pointed out hereinbefore that when the unijunction transistor 67 fires or is activated, there is an appreciable current increase in the base-one resistor 68. As is shown in FIG. 2, the resistor 68 has connected in parallel circuit relationship therewith the emitter-base junction of a signal amplifying NPN transistor 78. A current limiting resistor 79 is connected in series with the base electrode of transistor 78, and a pair of silicon diodes 80a and 80b, poled in agreement with the emitter-base junction, are serially connected to its emitter. The collector of this transistor is connected by way of a relatively small isolating resistor 81 and conductor 80a to an input terminal 82a of the static switch 19, terminal 82a being connected through a load resistor 83 and another resistor 84 to the positive terminal of the supply voltage source. It is apparent, therefore, that the signal amplifying transistor 78 will be turned on (become active) when its emitter-base junction is forward biased as a result of base-one current flowing from the unijunction transistor 67 upon activation thereof.

The diodes 80a and 80b are provided to ensure that the transistor 78 is not operated by the quiescent current of the unijunction transistor 67. Since each silicon diode inherently presents a relatively high impedance to the passage of a small quantity of forward current, the quiescent current of the unijunction transistor 67 prefers to follow a path through resistor 68 thereby avoiding activation of the transistor 78 which would take place if it were able to follow the parallel path through the emitter-base junction of this transistor. As a result, the transistor 78 will remain inactive until the unijunction transistor 67 has actually been fired.

The signal amplifying transistor 78, when active, produces a negative-going output control signal at the conductor 18a which emanates from the relay means 3a. This signal is applied to the static switch input terminal 82a for the purpose of initiating an opening operation of the circuit breaker 2, thereby disconnecting the protected circuit 1a from its source of power and hence interrupting the overcurrent flowing therein. Identical relay means (not shown) associated with the electric current circuits 1b and 1c operate in the same way to supply similar output control signals to two other input terminals 82b and 82c, respectively, of the static switch 19, and all three input terminals are joined together as is indicated in FIG. 2.

The static switch 19 in the illustrated embodiment of the inverse-time-overcurrent relay preferably comprises a solid state controlled rectifier 85. As is shown in FIG. 2, the relatively positive and negative electrodes (anode and cathode) of this device are connected, respectively, to the positive terminal of the battery 11 and to the trip coil 13 of the circuit breaker 2. Until fired or activated by a small "gate" current in its gate electrode 85a, the controlled rectifier 85 blocks current flow in both directions and hence is in effect an open circuit. When activated, however, it will abruptly change to a low-forward-impedance state which enables sufficient current to flow in the tripping circuit 11—12—13 of the circuit breaker 2 to effect actuation of the breaker latch 14. Since its anode current then exceeds a predetermined minimum value (the "holding current") required to sustain conduction in a controlled rectifier of the type illustrated, this device will remain active until the breaker auxiliary switch 12 opens, even if the gate signal were quickly removed.

In order to initiate firing of the controlled rectifier 85 whenever input terminal 82a is energized by a negative-going control signal, a PNP transistor 86 and a pulse transformer 87 have been provided. As can be seen in FIG. 2, the transistor emitter is connected directly to the positive supply voltage terminal, while its collector is connected by way of a resistor 88 and a primary winding 87a of the pulse transformer 87 to the negative supply voltage terminal. The secondary winding 87b of the pulse transformer is connected between the cathode and gate electrode of the controlled rectifier 85. A diode 89 disposed across the primary windings 87a and poled as shown serves to limit the peak secondary voltage which can be induced in the winding 87b, upon deactivation of the static switch, to less than the maximum permissible reverse gate voltage of the controlled rectifier 85. A connection is made from the base electrode of the transistor 86 to the junction between resistors 83 and 84, the resistor 84 being the base resistor of this transistor.

Normally the potential level at the input terminal 82a of the static switch 19 is nearly the same as that of the positive supply voltage terminal, negligible current can flow through the resistors 84 and 83, and the transistor 86 is necessarily turned off (inactive). However, as soon as the output control signal is developed by the relay means 3a, the input terminal 82a will become energized by a negative potential almost equal to the magnitude of the supply voltage, and current flow is immediately effected in the emitter-base junction of transistor 86. This activates the transistor 86 and causes a rapid current increase in the primary winding 87a of the pulse transformer 87. As a result, the secondary winding 87b, which is connected in the gate circuit of the controlled rectifier 85, supplies gate current in the proper direction and of appropriate magnitude and duration to fire this device.

Since the controlled rectifier 85 is relatively sensitive, and only a small gate signal is required to fire it, it is important to prevent stray voltage transients or surges in the relay circuits from activating the static switch at some inpropitious moment. Toward this end, the gate circuit of the controlled rectifier is provided with a surge suppressing combination of a capacitor 90 of small capacitance, connected between cathode and gate electrode, and a very small resistor 91 serially connected between the gate electrode and the pulse transformer secondary winding 87b. In addition, as can be seen in FIG. 2, the anode-cathode circuit of the controlled rectifier is provided with the surge suppressing series combination of an even smaller resistor 92 and a capacitor 93 connected thereacross. It will be recognized by those skilled in the art that these surge suppressing arrangements will absorb short-term transient surges thereby ensuring that the controlled rectifier will not be fired except, as described above, in response to a genuine control signal being applied to the input terminal 82a.

From the foregoing detail description of the circuitry and operation of the various functional components of the relay which is depicted in FIG. 2, the overall mode of operation may now be readily followed. For this purpose it will first be assumed that the protected circuit 1a has been subjected to an abnormality which causes a sudden increase in circuit current to an overcurrent value 2½ times greater than pickup. This is a relatively mild overcurrent condition, and the circuit current is still within the aforementioned first range of overcurrent values. Therefore the saturable transforming means 31 is operating in its linear region, and the value of secondary A.-C. voltage derived thereby will be 2½ times the 4-volt pickup level, or 10 volts R.M.S. Of course the starting means 60 instantaneously responds to any transformer secondary voltage in excess of pickup, and it activates the transistor 59 in the shunt circuit means 58 of the supervising means 49. As a result, the normally conducting diode 55, which had been preventing the timing capacitor 47 of the energy storing means 25 from charging, has positive supply voltage potential applied to its negative pole and is thereby rendered non-conductive, whereupon the capacitor 47 immediately begins accumulating energy supplied thereto by its D.-C. energizing circuit.

Figure 7:
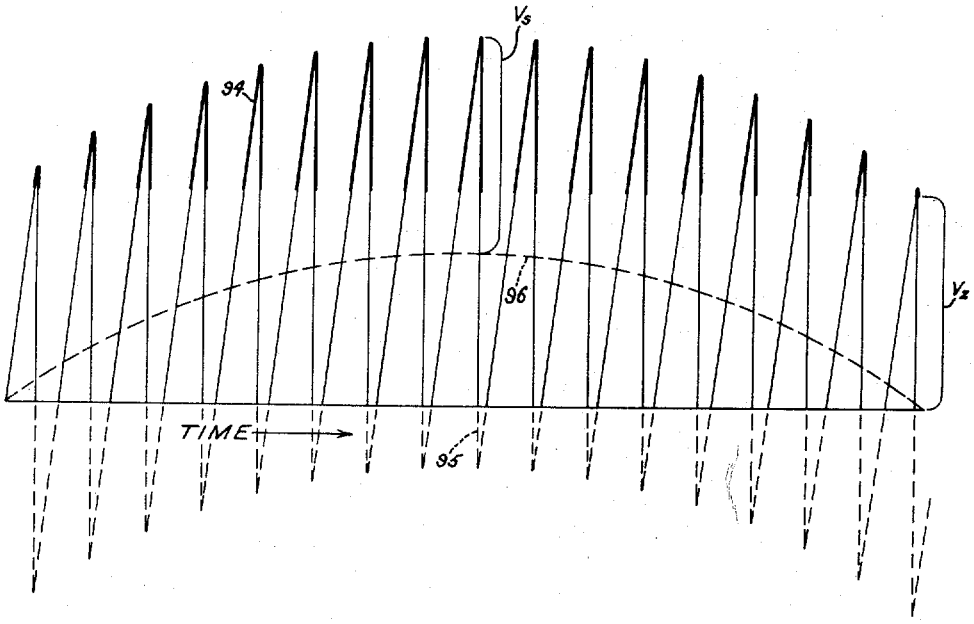
FIG. 7 is another voltage vs. time chart to facilitate a clear understanding of the mode of operation of the relay shown in FIG. 2.

The timing capacitor 47 is supplied with a high-frequency succession of triangular energizing pulses. This is illustrated in FIG. 7 which is a voltage-time chart, the interval of time shown corresponding to the duration of just a half-cycle of circuit current. In FIG. 7 the heavy-line triangles identified by the reference numeral 94 depict net voltage appearing between conductors A and D in the relay circuit of FIG. 2, which voltage is applied to the RC time delay circuit including the potentiometers 45 and 46 and the capacitor 47. These voltage triangles or pulses 94 recur at a constant frequency of 2,000 c.p.s., as determined by the sawtooth generator 23 which is producing, between conductors B and C in the adding circuit 22 of FIG. 2, a triangular waveform A.-C. voltage (reference numeral 95 in FIG. 7) of constant amplitude $V_s$. The height and duration of each net voltage pulse 94 is determined by the D.-C. voltage (the broken-line 180-degree sine wave 96 in FIG. 7) which the rectifier 33 provides between conductors A and B in FIG. 2. The D.-C. voltage 96, being derived from the protected circuit 1a by way of transformer 31 and hence being representative of the circuit current, has a magnitude of 10 volts R.M.S. corresponding to 2½ times pickup. Since the net voltage 94 comprises the sum of these A.-C. and D.-C. voltages 95 and 96 less the unipolarity reference voltage level $V_z$ which is introduced by the impedance means 41 between conductors C and D, with $V_z$ being equal to $V_B$, the height of each net voltage triangle is in fact equal to the instantaneous magnitude of the D.-C. voltage 96 at the same moment of time, and it follows that the integrated area of the energizing pulses 94 during a full cycle of circuit current is directly proportional to the square of the effective magnitude of the D.-C. voltage 96.

The timing capacitor 47 is incrementally charged by the chain of triangular energizing pulses 94 until the predetermined critical energy level is attained therein. In the example being considered it is assumed that the potentiometers 45 and 46 have been adjusted so that this will take about nine-tenths of a second, which is more than one hundred times longer than the time interval shown in FIG. 7. Since the capacitor voltage at its critical level is only two volts, it is apparent that at 2½ times pickup the average voltage gain per energizing pulse is very small. At the expiration of the designated time delay, the capacitor charge finally attains the predetermined magnitude which, in conjunction with the 8-volt bias provided by the resistor 56 in circuit therewith, will raise the emitter voltage on the unijunction transistor 67 of the level detector 26 to its critical 10-volt level. This is the peak or firing point of the unijunction transistor 67 whenever the sampling means 70 is active.

The sampling means 70, which is periodically active at the rate of 300 times a second, will be active and thereby enable the unijunction transistor 67 to fire at some time within .003-second following the critical energy level attainment in capacitor 47. In response to this event, the signal amplifying transistor 78 is turned on and a negative-going output control signal is produced at 18*a*. In the illustrated embodiment of the invention, this output signal initiates opening of a circuit breaker by activating the transistor 86 which causes a firing signal to be developed in the gate circuit of the controlled rectifier 85 of the static switch 19. As is indicated in FIG. 2, the consequent firing or activation of the controlled rectifier completes the energizing circuit for the breaker trip coil 13. The operating example just considered has been represented in FIG. 3 by a point 97 shown on curve 30, which curve depicts the operating characteristic obtained for the illustrated relay with the assumed timing adjustment.

Reference has been made hereinbefore to the desirable departure of the operating characteristic curve 30 from a true $I^2t$ relationship at its relatively low-overcurrent end, i.e., to the left of point 97 as viewed in FIG. 3. This is an inherent characteristic of my relay, and it will best be understood by examining FIG. 7. In FIG. 7 it is apparent that the height of the first and last energizing pulses 94 during each half-cycle of circuit current is quite small. As the voltage of the timing capacitor 47 approaches its critical 2-volt level near the end of the designated time delay, it will surpass the magnitude of at least one of these two pulses. Consequently, some of the periodic energizing pulses will not be contributing anything to the charge accumulating process, and the relay operating time will be slightly extended. This effect, is even more significant during lower-overcurrent, longer-operating-time conditions. For example, at 1½ times pickup there are around five or six energizing pulses every cycle of circuit current whose magnitudes are less than two volts, and the cumulative loss of their charging contributions as the capacitor voltage very slowly approaches its critical level, more than two seconds after the timing operation began, will be reflected in an appreciably longer time delay than would be obtained with an $I^2t$ relationship. During such low-grade conditions, then, the operating characteristic of my relay corresponds to an $I^nt$-equals-a-constant relationship, where n is a diminishing exponent greater than 2.

In further explanation of the mode of operation of the illustrated inverse-time-overcurrent relay, a second operating example will now be considered. Let it be assumed that a more severe abnormal circuit condition has occurred, and the current in circuit 1a suddenly rises to an overcurrent value 8 times greater than pickup. This current value, as will be explained hereinafter, is beyond the aforementioned first range of overcurrent values, and consequently the saturable transforming means 31 will be in its non-linear region. Assume, therefore, that the secondary A.-C. voltage derived by the transforming means 31 is only 7½ times the 4-volt pickup level, or 30 volts R.M.S.

The starting means 60 will again respond instantaneously to activate the shunt circuit means 58, whereupon the supervising means 49 enables the timing capacitor 47 immediately to start accumulating energy. Since the D.-C. voltage which is applied to the adding circuit 22 by rectifier 33 reflects the increased value of secondary voltage derived by the transformer 31, the timing circuit 25 is now energized by a train of triangular net voltage pulses having three times the height and duration of those shown at 94 in FIG. 7. But three times the duration (base) of those several triangular pulses of highet magnitude (the pulses which happen to fall between 70 and 110 electrical degrees on the 180-degree time interval shown in FIG. 7) will exceed the period of the high-frequency A.-C. voltage which is supplied by the sawtooth generator 23, and consequently the energization supplied to the timing circuit, for the particular condition assumed, will cease being a periodic quantity and will actually become continuous for approximately 40 electrical degrees every half cycle of circuit current. It is apparent, therefore, that the integrated area of the energizing pulses during a full cycle of circuit current at 8 times pickup will be slightly [more] *less* than nine times greater than the corresponding area at 2½ times pickup.

Under the more severe overcurrent condition now being considered, with no change in the relay's timing adjustment, the capacitor 47 will take [only about .09-second, or] about ten times longer than the time interval shown in FIG. 7[,] to accumulate the predetermined amount of energy required for firing, the unijunction transistor 67 when the sampling means 70 is active. As before, this response of the level detector 26 produces an output control signal at 18a, and the static switch 19 is activated thereby to perform its breaker trip coil energizing function.

From the foregoing description of operation at 8 times pickup, it will be apparent that *when* [the nonlinearity of the transforming means 31 prevents the illustrated relay from operating, at high multiples of pickup, with a time delay which would be appreciably shorter than one corresponding to a true $I^2t$ relationship. Whenever] the maximum magnitude of the D.-C. voltage applied to the adding circuit 22 of the relay exceeds the peak-to-peak magnitude (40 volts) of the pulsating triangular signal, the value of the net D.-C. signal energizing time delay circuit 25 will be continuously finite for at least two successive cycles of the sawtooth generator 23 each half cycle of circuit current, and *the relay tends to operate more slowly than would be expected at high multiples of pickup with a true $I^2t$ relationship.* [this tends to shorten the capacitor charging time.] This tendency, which becomes more pronounced as the circuit current increases, is *augmented* [offset or cancelled] by the nonlinearity of transforming means 31 which tends to limit the D.-C. voltage, relative to the circuit current from which it is derived, whereby this voltage increases proportionately less than circuit current.

In practice the transforming means 31 preferably is designed to begin saturating when the current in circuit 1a attains a value of the order of six or seven times pickup and thereafter progressively to limit the magnitude of the representative D.-C. voltage which is derived therefrom. By arranging the transforming means to have an appropriately high degree of nonlinearity, the desired deviation of the relay [operatnig] *operating* characteristic 30 (FIG. 3), in a prolonged-time sense, from a true $I^2t$ relationship at its relatively high-overcurrent end is obtained. For further information about this [fctaure] *feature* of the illustrated relay, see the copending patent application S.N. 128,472, filed on August 1, 1961, for C. A. Mathews and assigned to the assignee of the present invention.

While a preferred form of the invention has been shown and described by way of illustration, many modifications will occur to the skilled in the art. It is contemplated, therefore, by the claims which conclude this specification to cover all such modifications as fall within the true spirit and scope of the invention.

What I claim as new and desire to secure by United States Letters Patent is:

1. Means for initiating a predetermined control function in delayed response to the occurrence of an abnormal condition in an electric current circuit, the amount of delay being inversely related to the severity of the abnormal condition, comprising: condition responsive means adapted to be coupled to the circuit for deriving therefrom a D.-C. signal having a magnitude which is dependent upon the value of a characteristic electric quantity of the circuit; a pulsating signal source for supplying a succession of triangular-waveform signal pulses; adding means connected to said condition responsive means and to said pulsating signal source for providing a resultant signal corresponding to the sum of the D.-C. and pulsating signals; means for introducing, in substractive relationship with the resultant signal, a unipolarity reference signal level equivalent to the peak magnitude of the pulsating signal; electric energy storing means, including a reactance element, connected to said adding means for energization in accordance with the difference between the resultant signal magnitude and the reference signal level whenever the former exceeds the latter, whereby the time required for said reactance element to accumulate a predetermined amount of energy following the occurrence of an abnormal circuit condition is inversely related to the value of said characteristic electric quantity; and level detecting means, connected to said reactance element, adapted to initiate the predetermined control function in response to the accumulation in said element of said predetermined amount of energy.

2. Overcurrent responsive means for producing a voltage which is exponentially related to the value of current in an associated electric circuit, comprising: condition responsive means adapted to be coupled to the circuit for deriving therefrom a D.-C. signal representative of circuit current; a pulsating signal source for supplying a rapid succession of triangular-waveform signal pulses having a substantially constant peak magnitude; impedance means for establishing a unipolarity reference signal level equivalent to said peak magnitude of the pulsating signal; and energy storing means, comprising resistance and capacitance elements connected in series combination, disposed for energization by a quantity derived from the D.-C. signal plus the pulsating signal minus the reference signal, whereby the voltage across said capacitance element is a function of approximately the square of the D.-C. signal magnitude and hence is an exponential function of circuit current.

3. In an overcurrent protective relay for an alternating current circuit, the combination of: means adapted to be coupled to the circuit for deriving therefrom a D.-C. signal representative of the circuit current; a sawtooth generator for supplying a pulsating triangular signal, said pulsating signal being added to said D.-C. signal to provide a resultant signal equal to their sum; impedance means for establishing a unipolarity reference signal level equivalent to the peak magnitude of said pulsating signal, said reference signal level being subtracted from said resultant signal to provide a net signal equal to their difference; time delay means disposed for energization by said net signal; and a level detector connected to the time delay means for producing an output control signal when activated, said time delay means being arranged to activate the level detector, in response to the occurrence of an overcurrent condition in the circuit, after a time delay which is inversely related to approximately the square of the effective magnitude of the D.-C. signal.

4. The overcurrent relay of claim 3 in which the impedance means comprises a Zener diode.

5. Means for initiating a predetermined control function in delayed response to the occurrence of an abnormal condition in an alternating current circuit, the amount of delay being inversely related to the severity of the abnormal condition, comprising: condition responsive means adapted to be coupled to the circuit for deriving therefrom a D.-C. signal which comprises a susccession of unipolarity half-cycle waves representative of an alternating electric quantity of the circuit; an A.-C. signal source for supplying a triangular waveform signal of substantially constant amplitude, the frequency of said A.-C. signal being relatively high compared to that of said alternating electric quantity; adding means connected to said condition responsive means and to said A.-C. signal source for providing a resultant signal corresponding to the sum of the D.-C. and A.-C. signals; impedance means connected to said adding means for introducing, in subtractive relationship with said resultant signal, a unipolarity reference signal level equal to the amplitude of said A.-C. signal; electric energy storing means, including a reactance element, connected to said adding means and to said impedance means for energization in accordance with the difference between the resultant signal magnitude and the reference signal level whenever the former exceeds the latter, whereby the time required for said reactance element to accumulate a predetermined amount of energy following the occurrence of an abnormal circuit condition is inversely related to the value of said alterating electric quantity; and level detecting means, connected to said reactance element, adapted to initiate the predetermined control function in response to the accumulation in said element of said predetermined amount of energy.

6. In combination: transforming means adapted to be coupled to an electric circuit for deriving therefrom an A.-C. voltage which is dependent upon a characteristic electric quantity of the circuit; rectifying means connected to the transforming means for rectifying the A.-C. voltage; a pulsating voltage source for supplying a relatively rapid succession of triangular-waveform voltage pulses; impedance means serially connected to the pulsating voltage source for introducing, in subtractive relationship therewith, a unipolarity reference voltage level equal to the peak magnitude of the pulsating voltage; means comprising said rectifying means, said pulsating voltage source and said impedance means connected in series combination for developing a net voltage equal to the rectified A.-C. voltage plus the pulsating voltage minus the reference voltage; electric energy storing means, including a reactance element, disposed for energization by said net voltage, whereby the time required for said reactance element to accumulate a predetermined amount of energy whenever said characteristic electric quantity increases beyond a predetermined value is inversely related to an exponential function of the effective magnitude of the rectified A.-C. voltage; and level detecting means, connected to said reactance element, adapted to initiate a predetermined control function in response to the accumulation in said element of said predetermined amount of energy.

7. Relay means for initiating a predetermined control function in delayed response to the occurrence of an overcurrent condition in an electric current circuit, the relay means having an inverse-time-overcurrent operating characteristic, comprising: condition responsive means adapted to be coupled to the circuit for deriving therefrom a D.-C. voltage having a magnitude which is dependent upon the amount of circuit current; an A.-C. voltage source for supplying a triangular waveform voltage of substantially constant amplitude; an adding circuit to which said D.-C. and A.-C. voltages are serially applied for providing a resultant voltage equal to the sum of the D.-C. and A.-C. voltages; means connected to said adding circuit for introducing, in subtractive relationship with said resultant voltage, a unipolarity reference voltage level equal to the amplitude of said A.-C. voltage; electric energy storing means, including a reactance element, connected to said adding circuit for energization in accordance with the difference between the resultant voltage magnitude and the reference voltage level whenever the former exceeds the latter, whereby the time required for the energy accumulated in said reactance element to build up to a predetermined critical level following the occurrence of an overcurrent condition is inversely related to the amount of overcurrent in the electric current circuit; and level detecting means connected to said reactance element for initiating the predetermined control function in response to the attainment of said predetermined critical level of energy in said element.

References Cited by the Examiner

The following references, cited by the Examiner, are of record in the patented file of this patent or the original patent.

UNITED STATES PATENTS

| | | |
|---|---|---|
| 2,468,418 | 4/49 | Thumin. |
| 2,977,510 | 3/61 | Adamson. |
| 3,054,062 | 9/62 | Vonorburg. |

SAMUEL BERNSTEIN, *Primary Examiner.*